May 3, 1938. G. GUIDOROSSI 2,116,114
HARMONIOUS MELTING OF COMBINED THEATER AND CINEMATOGRAPH EXHIBITIONS
Filed Nov. 29, 1935 2 Sheets-Sheet 1

Inventor.
G. Guidorossi.
By William E. P. Bugh
His Attorney.

May 3, 1938.  G. GUIDOROSSI  2,116,114
HARMONIOUS MELTING OF COMBINED THEATER AND CINEMATOGRAPH EXHIBITIONS
Filed Nov. 29, 1935  2 Sheets-Sheet 2
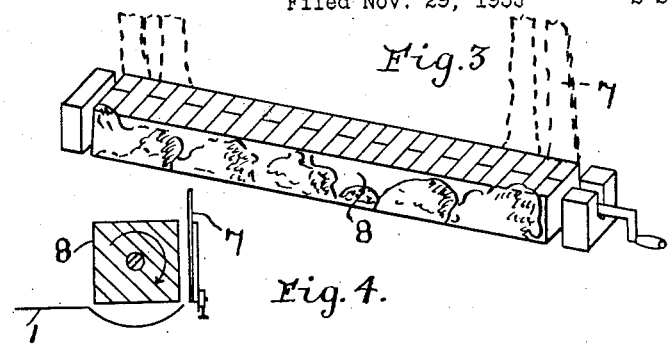
Fig. 3.
Fig. 4.
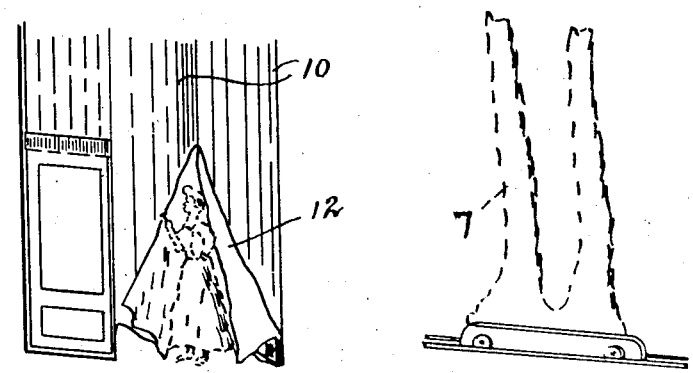
Fig. 5.
Fig. 6.
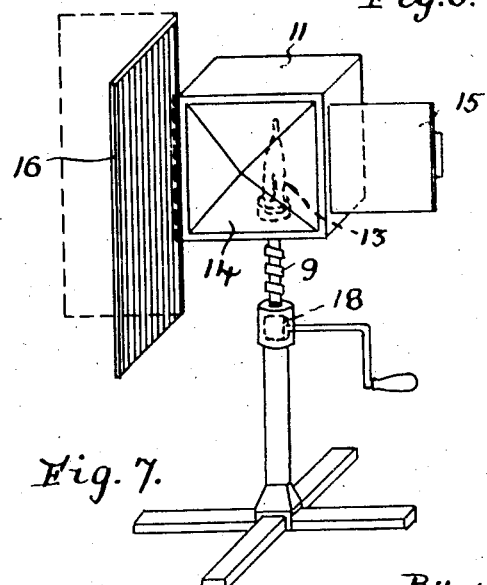
Fig. 7.
Inventor.
G. Guidorossi.
By William E. P. Bayly.
His Attorney.

Patented May 3, 1938

2,116,114

UNITED STATES PATENT OFFICE 2,116,114

HARMONIOUS MELTING OF COMBINED THEATER AND CINEMATOGRAPH EXHIBITIONS

Giuseppe Guidorossi, Milan, Italy

Application November 29, 1935, Serial No. 52,233

1 Claim. (Cl. 88—24)

The present invention relates to a theatrical production by the combination of the theatre with actors and projectors and has for its object to provide a simple and efficient means whereby the scenes projected upon a screen are in perfect harmony with the play enacted upon the stage.

According to the present invention a stage is provided in which the side walls thereof and roof converge towards the rear and said side walls are covered with black draping, a projector screen is hung at the rear of the stage, and a plurality of projectors are disposed behind said screen which simultaneously project on to the screen stationary and movable scenes, which latter, are in harmony and agree in every respect with the play enacted by the actors upon the stage, and a plurality of lamps are angularly disposed adjacent the side walls of the stage in such a manner that the light rays emitted therefrom are directed across the stage out of alignment of the screen.

The invention will now be described with reference to the accompanying drawings, in which:—

Fig. 3 is a detail of the scenery.

Fig. 4 is a cross-section of Fig. 3.

Fig. 5 is a detail of the side of the stage.

Fig. 6 is a detail of the means for shifting some of the scenery, and

Fig. 7 is an enlarged front view of a lamp.

Figure 1:
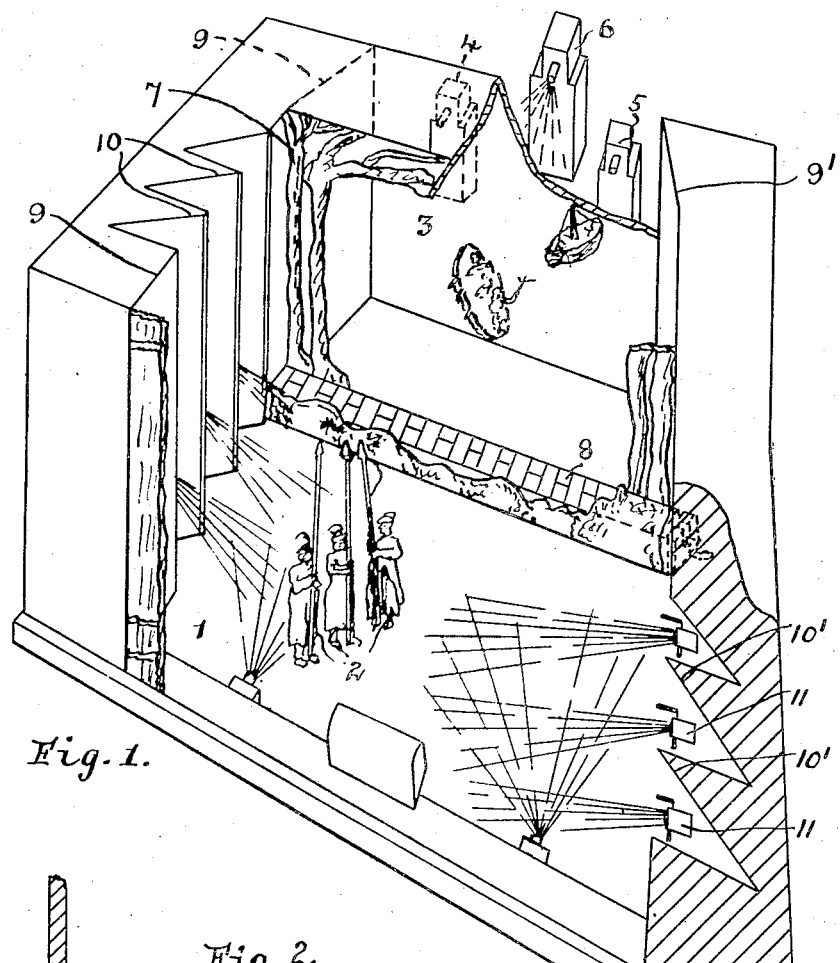
Fig. 1 is a perspective view of the stage with a part broken away for clearness.
Figure 2:
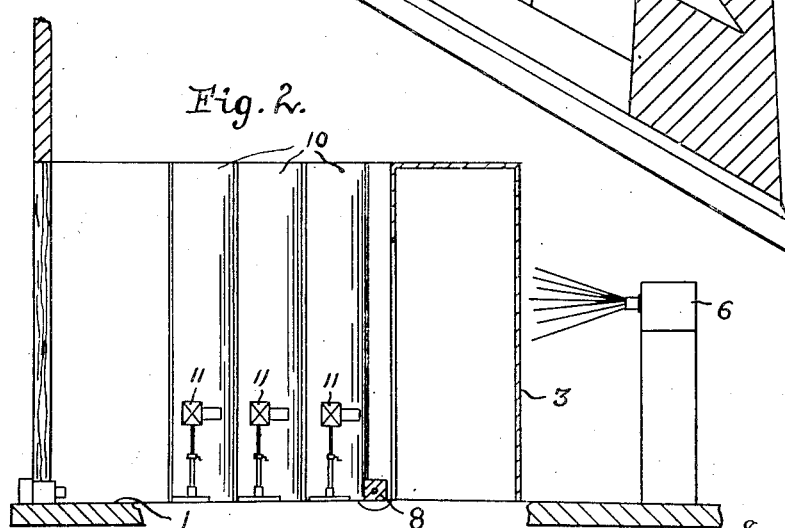
Fig. 2 is a half sectional elevation of the stage.

1 is the floor of the stage which is occupied by the actors 2, 3 is the screen hung at the rear of the stage 1, behind which are two magic lanterns 4, 5, and a cinematograph 6 interposed therebetween. The magic lanterns 4, 5, are adapted to project stationary scenes upon the screen 3 and the cinematograph 6 the moving scenes, which scenes are in perfect harmony in every respect with the play acted by the players 2.

Disposed immediately in front of the screen 3 is the stage scenery which are movable. These scenes 7, for example, in the shape of trees as shown in Fig. 1, are mounted upon rollers (Fig. 6) which ride on suitable runways. The additional scenes adjacent the base of the screen 3 which extend across the stage 1, are arranged upon a four-sided drum 8 (Figs. 3 and 4). That is to say, each side of the drum 8 is designed to carry a particular piece of scenery, so that, upon rotation of the drum by handle at one end, the four scenes can be exposed successively as and when required in order to tone with the other scenery, such as shown upon the screen and correspond with the play acted upon the stage 1.

The illumination of the stage is effected by the side walls 9, 9' being lobated and draped in black as indicated by the numerals 10, 10'. Within each recess formed by the lobated walls 9, 9', is a lamp 11 so as not to be visible to the spectators. The lamps 11 are adapted to direct their light rays at an incline across the stage away from the screen; some of these said light rays are also directed upon a prism, where they are refracted across the stage.

The side walls 9, 9', are so constructed that they, together with the roof converge towards the screen.

The black draping 10, 10' is provided with suitable openings through which the actors can pass on or off the stage, as shown in Fig. 5.

The lamps 11 11 as herein described with reference to Fig. 7, has the illuminant 13 arranged in a lamp with a glass prism 13, and a colored glass plate 15 is slidably mounted in the lamp behind the glass prism 13 for the purpose of varying the colour of the light directed across the stage. At right angles to said prism 13 is a black plate 16 which absorbs any light rays that are likely to be directed towards the screen 3. The lamp 11 is mounted upon a stand and can be raised or lowered by worm gearing 18 actuated by a handle.

From the foregoing description, it will be seen that the lighting effect upon the stage is directed on to the actors and away from the screen.

The moving scenes projected by the cinematograph are as hitherto, first photographed, and may be taken from nature, for example, a rough sea, or from a specially prepared scene, and the magic lanterns project stationary scenes which have been previously photographed or otherwise prepared, so that when these moving and stationary scenes are projected upon the screen simultaneously they will correspond with the play performed by the actors.

It is an essential feature of this invention that the scenes projected upon the screen are not out of proportion with the actors; thus with this combined effect a play upon the stage can be made to be much more realistic than hitherto.

I claim:

The combination of projectors, a rear projection screen, a stage having movable scenes at the sides and top thereof, lobulated side walls on the sides of said stage, the said projection screen forming rear wall of said stage, a flat sided rotatable drum carrying a plurality of auxiliary scenes positioned on the stage floor between the said side movable scenes and the said projection screen, means for rotating said flat sided drum, a plurality of lamps mounted in the lobulated side walls to illuminate the stage to desired intensity relative to the intensity of illumination of the said screen, a stage for actors before the screen and in the general location of said movable scenes whereby an observer positioned in front of the stage will view the actors, the movable scenes and the projected scenes as a unitary and related stage combination.

GIUSEPPE GUIDOROSSI.